United States Patent [19]

Vegso

[11] Patent Number: 4,953,584
[45] Date of Patent: Sep. 4, 1990

[54] VACUUM BREAKER VALVE

[75] Inventor: Lajos Vegso, Culver, Ind.

[73] Assignee: Bristol Corporation, South Bend, Ind.

[21] Appl. No.: 48,810

[22] Filed: May 12, 1987

[51] Int. Cl.[5] .......................... F16K 24/00; E03C 1/10
[52] U.S. Cl. ..................................... 137/218; 137/512.4
[58] Field of Search .............................. 137/218, 512.4

[56] References Cited

U.S. PATENT DOCUMENTS

| Re. 30,849 | 1/1982 | Crist | 137/218 |
|---|---|---|---|
| 2,449,573 | 9/1948 | White | 137/218 |
| 3,482,736 | 12/1969 | Green | 137/512.4 X |
| 4,080,981 | 3/1978 | Stewart | 137/218 |
| 4,117,856 | 10/1978 | Carlson | 137/218 X |

Primary Examiner—Gerald A. Michalsky
Attorney, Agent, or Firm—James D. Hall; Thomas J. Dodd; Todd A. Dawson

[57] ABSTRACT

A fluid valve structure which combines anti-siphon and anti-backflow features in a single element. The valve utilizes an insert which separates the valve body into two distinct and non-communicating chambers, permits the flow of air through one of the chambers and fluid through the other and fixes a flexible flapper-type diaphragm over the entry passages into the chambers. Due to the flexibility of the diaphragm and the independence of the chambers, that portion of the diaphragm in each chamber operates independently of the other in response to varying conditions of pressure and flow.

6 Claims, 2 Drawing Sheets

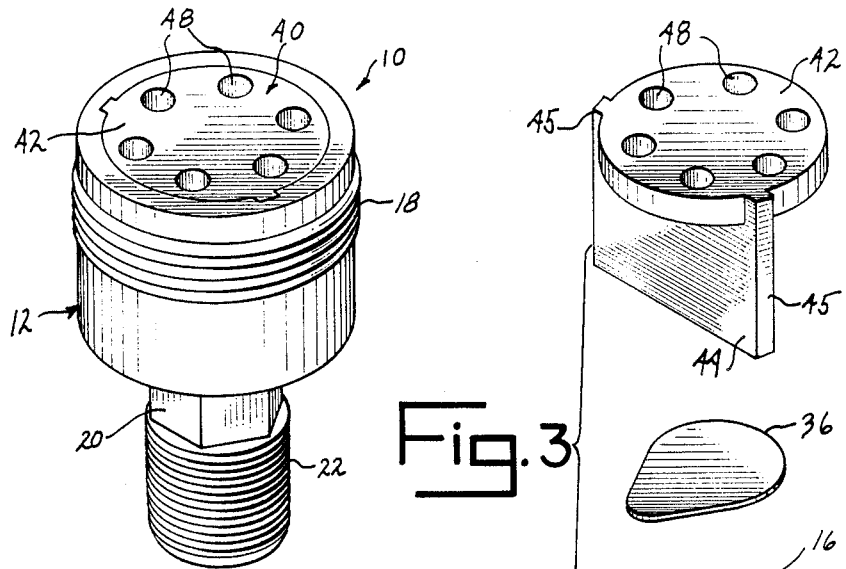
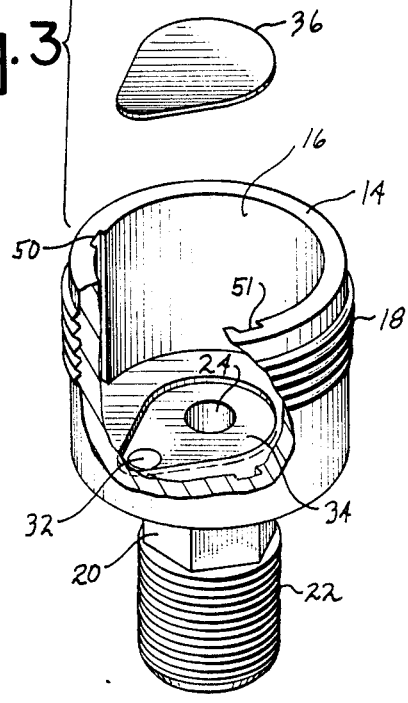
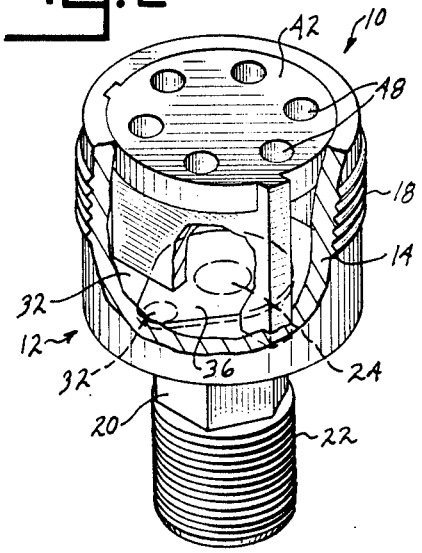

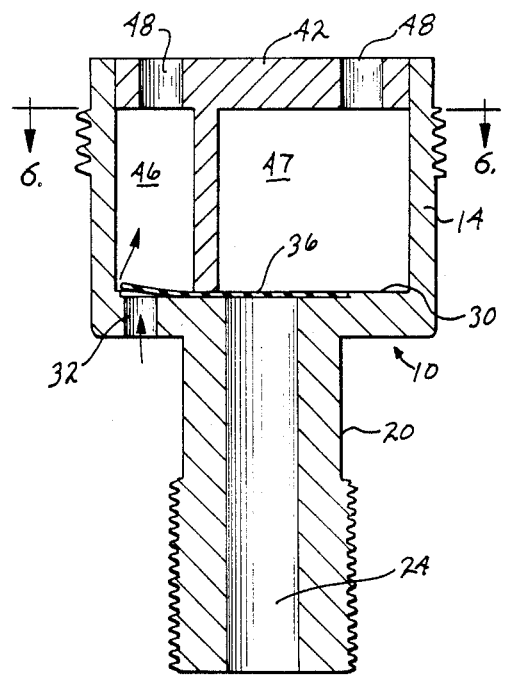
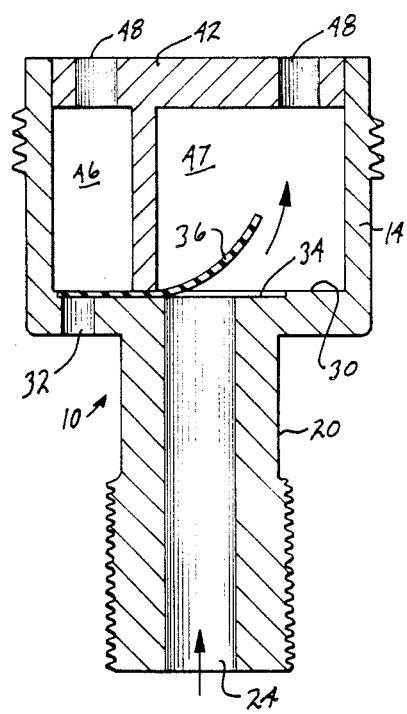
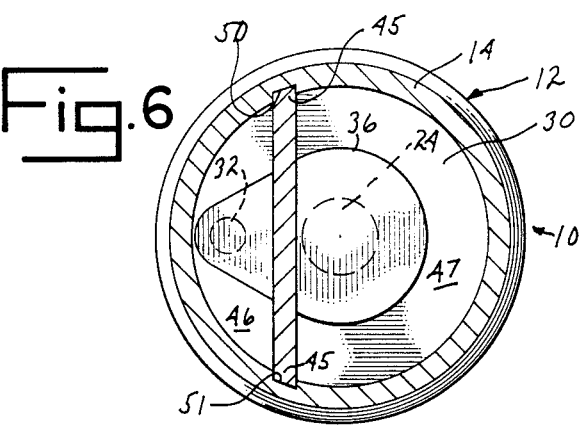

VACUUM BREAKER VALVE

BACKGROUND OF THE INVENTION

The present invention relates to an improved fluid valve structure, more particularly one which combines anti-siphon and anti-backflow features in a single element.

The valve structure of the present invention is in the category or class of valves which are adapted to insertion in a fluid feed line between a nozzle or discharge orifice and the fluid supply from which fluid is drawn. Such a valve can be used in a multiplicity of lines and is especially adaptable to self-contained fluid systems or in systems having limited space.

The invention is herein described in the context of the utilization of water systems which are found in mobile homes or recreational vehicles, and is applicable to any system which incorporates a flexible hose connection, whether it be found in a shower, wash basin, bath tub, or the like. The valve of this structure is especially useful in such an environment due to the fact that such fluid systems incorporate a closed or self-contained water supply source from which all utilization of water derives. Another characteristic of such systems is that they operate under low fluid pressure conditions.

Because of the character of such a self-contained water supply system and the danger of contaminating the water, such systems are subject to rather stringent sanitary codes which require the insertion in the supply line of valves which prevent back flow or re-entry into the system of previously used or contaminated water.

Valves designed to achieve this result have been in use for several years, and are associated with or contain means to permit the entry of air into the water line under conditions that would otherwise create a siphon condition. In such valves, many complex designs have been used in order to open and close such air vents and to prevent the fluid from leaking through said air vents.

Most existing valves incorporate dual co-operating air valves and check valves, some of which are cumbersome and large, but all of which are relatively expensive. Even those incorporating a single valve chamber, such as in U.S. Pat. No. 3,951,164, utilize very complex structure within that chamber.

It is accordingly an object of this invention to provide a novel valve structure which is simple in its design, efficient in its operation and which is inexpensive to produce.

SUMMARY OF THE INVENTION

The improved valve consists of a single chamber, having insertable therein a simple structure which separates said chamber into two chambers and which at the same time fixes in place a one piece flexible flapper type diaphragm member which overlies a water inlet portion and an air vent portion of said chamber.

The valve itself is designed so to be inserted in a fluid line as a normal ordinary plumbing installation. At the inlet end of the chamber there is a conventional opening to permit the flow of fluid and at the outlet end there is a conventional opening to permit the flow of fluid through and from the chamber. Also at the inlet end of the chamber there is an air port to permit entry of air into the line under conditions which would otherwise permit siphoning of fluid.

At the inlet end of the chamber there is positioned the single-piece diaphragm member which covers the fluid inlet and the air port. A disc is positioned at the outlet end of the chamber. The disc has an outer diameter which is the same as the inside diameter of the chamber and has a plurality of holes therein to permit the flow of fluid therethrough.

Fixed to the disc, or molded integrally therewith, is a solid plate portion which extends beyond the periphery of the disc and is of a length equal to the distance as the depth of the slots described previously and of a length equal to the distance between the disc and the diaphragm member. In effect, the solid plate portion, when the assembly is inserted, separates the chamber into two distinct chambers without any access between them and with the diaphragm member being anchored over the liquid inlet and air port.

When the valve is inserted into the fluid line and the liquid is flowing, by virtue of the user turning a conventional valve which is not shown, the flexible diaphragm member is displaced from its position over the inlet opening. During the time that the liquid is flowing, the flexible diaphragm member presses against the air port thereby preventing the leakage of water. When the liquid flow is terminated, the diaphragm, through a combination of its elasticity and the mild vacuum created behind the valve, closes the opening and prevent fluid beyond the valve from returning to the liquid source.

When the pressure downstream the valve is less then that about the valve, such when there is no pressurized flow through the valve, that portion of the diaphragm member which covers the air port is flexed away from contact with the air port, permitting air to enter the stream of fluid. This equalizes the pressure, bleeds the downstream liquid, and prevents reverse flow or siphoning of the liquid.

The diaphragm member is shaped to fit a recess in the inlet end of the chamber and is held in place by the plate portion of the disc previously described. The diaphragm member is of a commonly used flexible material which is durable and long-lasting. Due to its simplicity, the valve components can be manufactured at a very reasonable cost.

DESCRIPTION OF THE DRAWINGS

FIG. 1 is a perspective view of the valve;

FIG. 2 is a perspective view of the valve, with portions removed to display the interior structure;

FIG. 3 is an exploded view of the valve, with portions removed to display the interior configuration;

FIG. 4 is a longitudinal sectional view of the valve, showing the air port portion in the open position and the liquid inlet portion in the closed position, in a mode to prevent siphoning;

FIG. 5 is a longitudinal sectional view of the valve, showing the valve during normal flow conditions with the air port closed and the liquid port open;

FIG. 6 is a cross sectional view of the valve along the line 6—6 in FIG. 4.

DESCRIPTION OF THE PREFERRED EMBODIMENT

Referring to the drawings, a backflow preventing and anti-siphoning valve 10 includes a valve body 12 defined in part by a tubular wall 14. This wall surrounds and defines a main valve chamber 16 within valve 10. Wall 14 contains threads 18 on its exterior in order that the valve may be mated into a plumbing system (not shown).

Extending downwardly from and formed integrally with valve body 12 is valve inlet nipple 20, also of tubular configuration and of a smaller diameter than valve body 12. Inlet nipple 20 is externally threaded as at 22 for mating into the plumbing system. Inlet nipple 20 has an internal passageway 24 through which fluids flow into valve chamber 16.

Valve body 12 has a bottom wall 30 which surrounds inlet nipple 20. Bottom wall 30 includes, spaced from inlet nipple 20, at least one air port 32 connecting valve chamber 16 to ambient air. Bottom wall 30 also includes an internal recess 34 surrounding liquid port or passageway 24 and air port 32. In the area surrounding liquid passageway 24, recess 34 preferably has a radius at least twice the radius of passageway 24. In the area surrounding air port 32, recess 34 has a radius preferably of approximately twice the radius of air port 32. These two radii are tangently connected to form tear drop shaped recess 34 as may be seen in FIGS. 3 and 6. Although the size of recess 34 has been expressed in its preferential size, it will be understood that the size is not critical. It is only important that it extends beyond the edges of air port 32 and fluid passageway 24 to permit diaphragm member 36 to cover both. A slightly different shape is permissable without departing from the scope of the invention, provided that the recess serves the purpose for which it is intended.

The purpose of recess 34 is to serve as a seat for flexible flapper-type diaphragm member 36. The depth of recess 34 approximates the thickness of diaphragm member 36 and the peripheral shapes of the recess and the diaphragm member are generally the same. Recess 34 serves to prevent the diaphragm member 36 from rotating or sliding from its position over liquid passageway 24 and air port 32.

Forming a part of valve 10 is insert 40 which is positioned within valve chamber 16 and which retains diaphragm member 36 in position. Insert 40 divides valve chamber 16 into two distinct and separate chamber parts 46 and 47, and provides each chamber part with one or more outlets at the outlet end of valve chamber 16. Chamber part 46 is the chamber into which ambient air is permitted to enter and chamber part 47 is that through which the liquid of the system normally flows.

Insert 40 includes two basic elements, a disc 42 and a plate 44. The elements may be formed separately and connected by conventional bonding means, but are preferably formed as an integrally molded unit. When inserted into valve chamber 16, disc 42 forms the upper wall of valve body 12, and plate 44 separates valve chamber 16 into its heretofore described two distinct, separate and non-communicating chamber parts 46 and 47.

The diameter of disc 42 is substantially the same as the inside diameter of valve chamber 16, so that a press fit is effected when insert 40 is mated with valve body 12. Plate 44 extends from disc 42 a distance equal to the depth of valve chamber 16, so that, when mated, plate 44 abuts valve body bottom wall 30 and disc 42 is flush with the outlet end of valve body 12. Plate 44 is located between air port 32 and passageway 24 where it abuts bottom wall 30 and serves to hold and anchor diaphragm member 36 within recess 34.

Disc 42 includes a plurality of openings 48, spaced about its perimeter, through which liquid flows or ambient air is permitted entry into the system. In the preferred embodiment, there are six such equally spaced openings, four of which provide passage of liquid through chamber part 47 and two of which provide passage of air through chamber part 46.

Plate 44 extends transversely beyond the edge of disc 42 to provide tab sides 45. On the inside of tubular wall 14 of valve body 12, extending the length of valve chamber 16, are two opposed slots 50, 51, which accommodate plate tab sides 45 of insert 40 to prevent plate 44 from "fluttering", insert 40 from rotating and to fix plate 44 in its proper holding position with regard to diaphragm member 36. If a permanently assembled valve is desired, insert 40 can be bonded to valve body 12. Having described the various structural components of the valve and their inter-relationship, its operation will again be briefly reviewed.

During the time that liquid is flowing through the valve, as shown in FIG. 5, that portion of flexible diaphragm member 36 which extends into chamber part 47 flaps upwardly, permitting the uninhibited flow of liquid from passageway 24 through the system and out openings 48 of the chamber. During this same time, that portion of diaphragm member 36 which extends into chamber part 46 is normally held against air port 32.

When a low-pressure condition arises downstream of valve 10 which might cause undesirable siphoning, such as when the fluid flow through the valve is terminated and liquid drains downstream from valve 10, that portion of diaphragm member 36 in chamber part 46 flexes to permit the entry of air through air port 32, as shown in FIG. 4, into chamber 46 and therefrom into the system, thereby permitting draining of the plumbing system downstream of valve 10. At this same time, it will be seen that diaphragm member 36 within chamber part 47 remains fast against liquid passageway 24, generally by the negative pressure within the connected upstream plumbing system, thereby preventing the backflow of any liquid through the valve and back into the self-contained fluid plumbing system.

It will thus be seen that the air flow portion and the liquid flow portion of the diaphragm member, being of the flapper-type, work completely independently of one another, even though they are opposite ends of a singular member. Each is able to respond rapidly to varying conditions of pressure and flow.

The foregoing has been achieved with a device having no moving parts, with the exception of the flapper member, and an extremely simple and economic insert. This makes the valve easy to insert into the plumbing system and, when the flapper member eventually wears out, the flapper may be quite easily replaced.

It is to be understood that this invention is not to be limited to the details above described but it may be modified in accordance with the following claims.

What is claimed is:

1. A valve for preventing backflow and siphoning, comprising a valve body having an air inlet port, a liquid inlet port and a liquid outlet opening, an insert part including a plate member which extends into said valve body and constitutes means serving to divide the valve into first and second separate chambers, said first chamber having said air inlet port and being in communication with said liquid outlet opening, said second chamber having said liquid inlet port and being in communication with said liquid outlet opening, a single piece diaphragm overlying both said inlet ports and being of such resiliency as to permit movement at each inlet port independently of the other in response to pressure conditions within each of said chambers, said plate member overlying contacting said diaphragm to anchor the diaphragm at said inlet ports.

2. A valve as set forth in claim 1 wherein one said first chamber is an air chamber and said second chamber is a liquid chamber.

3. A valve as set forth in claim 1 wherein said insert part includes a disc from which depends said plate member, said disc extending across said valve body outlet opening and having openings therethrough into each of said first and second chambers.

4. A valve as set forth in claim 1 wherein said plate member is offset from the center of said disc to an extent such that the volumes of said first and second chambers are not equal.

5. A valve as set forth in claim 4 wherein the smaller of said chambers is said first chamber.

6. A valve for preventing backflow and siphoning, comprising a valve body, an insert part consisting of a disc from which depends a plate member which serves to divide the valve into first and second chambers, the valve body including an air port leading into said first chamber and a liquid inlet leading into said second chamber, said disc including a plurality of outlets leading out of said chambers, a first flow path running from the air port through said first chamber to at least one of said outlets, a second flow path running from the liquid inlet through said second chamber to at least another one of said outlets, and a single piece flexible diaphragm held in place over both of said air port and liquid inlet by said plate member, said diaphragm acting as a closing member to selectively permit air or liquid flow in said flow paths responsive to pressure conditions upstream and downstream of said valve.

* * * * *